(12) United States Patent
Ramsay et al.

(10) Patent No.: US 7,898,121 B2
(45) Date of Patent: Mar. 1, 2011

(54) LINEAR ACTUATOR

(75) Inventors: Keith Ramsay, Northamptonshire (GB); Andrew Turner, Warwickshire (GB); Richard E. Clark, Shelfield (GB)

(73) Assignee: Ricardo UK Ltd, West Sussex (GB)

( * ) Notice: Subject to any disclaimer, the term of this patent is extended or adjusted under 35 U.S.C. 154(b) by 179 days.

(21) Appl. No.: 12/067,669

(22) PCT Filed: Sep. 21, 2006

(86) PCT No.: PCT/GB2006/003521
§ 371 (c)(1),
(2), (4) Date: May 30, 2008

(87) PCT Pub. No.: WO2007/034195
PCT Pub. Date: Mar. 29, 2007

(65) Prior Publication Data
US 2008/0220930 A1  Sep. 11, 2008

(30) Foreign Application Priority Data

Sep. 21, 2005 (GB) .................................. 0519255.4
Sep. 5, 2006 (GB) .................................. 0617424.7
Sep. 5, 2006 (GB) .................................. 0617543.4

(51) Int. Cl.
*H02K 41/00* (2006.01)

(52) U.S. Cl. ............ 310/14; 310/12.24; 310/15; 310/35; 310/71; 310/89; 310/101; 310/144; 318/119; 318/121; 318/122; 318/126; 318/135; 74/473.1; 74/473.23

(58) Field of Classification Search ................ 310/12.24, 310/15–35, 71, 89, 101; 100/144; 318/121, 318/122, 126, 135; 74/473.1, 473.23; *H02K 41/00*
See application file for complete search history.

(56) References Cited

U.S. PATENT DOCUMENTS 4,349,757 A * 9/1982 Bhate .............................. 360/15

(Continued)

FOREIGN PATENT DOCUMENTS

DE     3346917     9/1984

(Continued)

OTHER PUBLICATIONS

J.C. Wheals et al., "Automated manual transmissions—A european survey and proposed shift quality metrics," SAE 2002 World Congress, Detroit, MI, USA, Transmission & Driveline Systems Symposium (Part C)—AMT/Transmission Systems. Document No. 2002-01-0929, Mar. 2002.

(Continued)

*Primary Examiner* — Quyen Leung
*Assistant Examiner* — John K Kim
(74) *Attorney, Agent, or Firm* — Gifford, Krass, Sprinkle, Anderson & Citkowski, P.C.

(57) ABSTRACT

A linear actuator includes permanent magnet annuli arranged about an armature core for axial movement in a tubular stator upon energization of coils arranged in concentric association with the armature. The stator has portions extending radially inwards of the coils and towards one another beneath each coil, which define a spacing between the coil and the armature. The annuli have a substantially radially magnetized structure and the coils are configured for single phase power input. In one embodiment (FIG. 6), two pairs of spaced annuli are arranged on the core, wherein the axial length of the outermost annuli is half the axial length of the inner annuli.

11 Claims, 8 Drawing Sheets

U.S. PATENT DOCUMENTS

| | | | | |
|---|---|---|---|---|
| 4,422,060 | A * | 12/1983 | Matsumoto et al. | 335/256 |
| 4,785,816 | A * | 11/1988 | Dow et al. | 600/446 |
| 4,924,123 | A * | 5/1990 | Hamajima et al. | 310/15 |
| 5,896,076 | A * | 4/1999 | van Namen | 335/229 |
| 6,508,139 | B2 * | 1/2003 | Onodera | 74/335 |
| 6,739,211 | B2 * | 5/2004 | Yamamoto et al. | 74/335 |
| 6,856,049 | B2 * | 2/2005 | Hirata | 310/12.16 |
| 7,469,614 | B2 * | 12/2008 | Wang | 74/473.23 |
| 2002/0020236 | A1 * | 2/2002 | Onodera | 74/335 |
| 2004/0226801 | A1 * | 11/2004 | De Jonge et al. | 192/220.7 |
| 2004/0244524 | A1 * | 12/2004 | Russell | 74/473.23 |
| 2005/0023905 | A1 * | 2/2005 | Sakamoto | 310/12 |
| 2005/0223835 | A1 * | 10/2005 | Wang | 74/473.18 |
| 2006/0049701 | A1 * | 3/2006 | Sato | 310/14 |
| 2006/0181158 | A1 * | 8/2006 | Tajima et al. | 310/12 |
| 2008/0220930 | A1 * | 9/2008 | Ramsay et al. | 476/4 |

FOREIGN PATENT DOCUMENTS

| | | |
|---|---|---|
| EP | 1225373 | 7/2002 |
| FR | 2829551 | 3/2003 |
| WO | 2004082103 | 9/2004 |

OTHER PUBLICATIONS

G. Iordanidis, D. Holliday, P. Mellor, "Fast acting sequential embedded electric gearbox actuator", SAE 2005 World Congress, Detroit, MI USA, Transmission & Driveline Systems Symposium—Manual Transmissions/Automated Manual Transmission (Part 7), Document No. 2005-01-1781, Apr. 2005.

A.J. Turner, K. Ramsay, R.E. Clark, D. Howe, "Development of high force electromechanical linear actuator for shift-by-wire automated manual transmission," SAE 2006 World Congress, Detroit, MI USA, Transmission & Driveline Systems Symposium—Components (Part 8). Document No. 2006-01-0360, Apr. 2006.

J. Wang, D. Howe, "Design optimization of radially magnetized iron-cored, tubular permanent magnet machine and drive systems," IEEE Transactions on Magnetics, vol. 40, No. 5, Sep. 2004, pp. 3262-3277.

S.E. Moon, M.S. Kim, H. Yen, H.S. Kim and S.H. Hwsang, "Design and implementation of clutch-by-wire system for automated manual transmissions," International Journal of Vehicle Dynamics, vol. 36, No. 1, pp. 83-100 (2004).

A.J. Turner, K. Ramsay, "Review and Development of Electromechanical Actuators for Improved Transmission Control and Efficiency," SAE 2004 World Congress & Exhibition, Mar. 2004, Detroit, MI USA, Session: Transmission & Driveline Systems Symposium—Components (Part 6 of 7). Document No. 2004-01-1522.

I. Boldea, S.A. Naper, "Linear electric actuators and generators," IEEE Transactions on Enter Conversion, Sep. 1999, 14(3); 712-17.

* cited by examiner

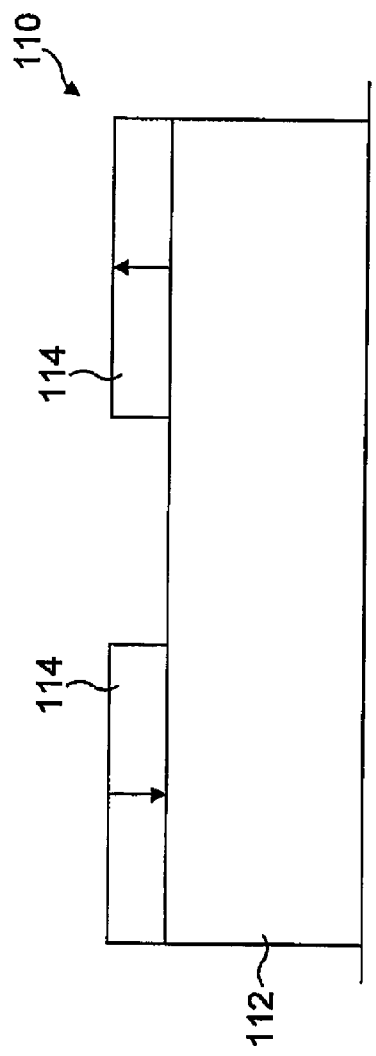
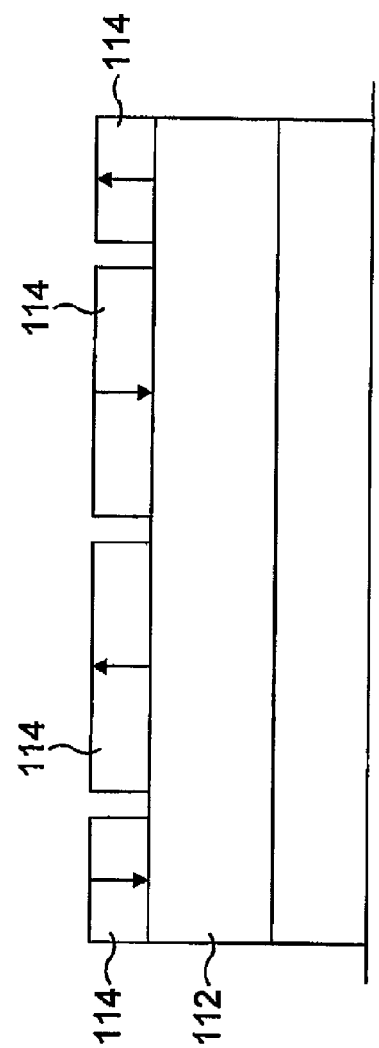

LINEAR ACTUATOR

This invention relates to linear actuators and more particularly, but not exclusively, to linear actuators for use in gearshift mechanisms of vehicle gearboxes, such as in automated manual gear transmissions.

Conventional multi-speed gear transmissions of vehicles are well-known and generally comprise multiple gear pairs selectable on demand by the vehicle driver via a gearshift lever. Ratio selection is generally via a 'rail' which is movable axially from a neutral position to engage a loose gear to a shaft via a synchronizer hub. Typically three double acting rails are provided in a transmission having five forward ratios and one reverse ratio.

Automatic vehicle transmissions have traditionally relied upon multiple planetary gear trains, particular components of which are held stationary to provide a desired torque path. Hydraulically actuated brake bands and/or multi-plate clutches are typically provided. Hydraulic fluid under pressure is supplied via a transmission driven oil pump, and ratio selection is via a controller and valve block having numerous spool valves. Such automatic transmissions are less efficient than corresponding manual transmissions, not least because of the power requirement of the pump. Traditional automatic transmissions are also bulky, and may cause difficulties where the installation space is restricted. As a result an automatic variant of a vehicle may have fewer speed ratios than a manual variant.

More recently automated manual transmissions have been developed, in which clutch engagement and ratio change is under the control of one or more actuators. In particular such a transmission may be substantially identical to a manual variant, but with a controller and actuators operable to move conventional shift rails.

Hydraulic actuators have been proposed, and are highly suitable because of the high force density which can be achieved. Such actuators are well understood and rely upon a mature technology. The necessary pump can be mounted in a variety of positions, so that space constraints may be overcome. However, overall power consumption remains high; there is a residual power loss since the pump is driven continuously by the transmission, and there is the attendant risk of leaks, both internal and external.

There is a need for alternative means of moving a transmission selector rail, preferably having a low overall power consumption, a high force density, and/or zero or minimal power consumption when in a passive (non-moving) state.

According to the invention, there is provided a linear actuator comprising a stator and an electrically operable moving magnet armature within said stator, the armature comprising a core and permanent magnet rings or annuli arranged about the core in opposing magnetic polarity, the stator having a plurality of coils arranged in association with said permanent magnet annuli, wherein the armature is movable axially of the stator on electrical energisation of said coils.

The term annulus or ring should not be considered to be limited to objects of circular cross-section. The permanent magnet annuli or rings are preferably of circular cross-section, but may be of non-circular cross section, e.g. pentagonal, hexagonal or octagonal. The permanent magnet structures of the armature are preferably tubular.

It will be understood that an axial clearance exists between the armature and the stator, to enable the armature to move relative to the stator. However, in the preferred embodiments, the stator defines a further air gap, for example wherein the coil is radially spaced from the armature within the body of the stator.

Preferably, the stator includes portions of magnetic material which extend radially inwards of the coils, for example on either side of each coil. More preferably, the stator includes opposing projections of magnetic material extending axially towards one another beneath each coil.

In a preferred embodiment, the stator includes axially opposing tips which extend towards one another beneath the coils, separated by an air gap. The tips may be rectangular in cross-section, or may comprise a tapered structure, for example. The projections, and in particular the tips, can be configured to improve the flux linkage between the coils and the moving magnet armature, so as to improve the efficiency and dynamic response of the linear actuator.

The linear actuator is preferably of tubular construction. The coils are preferably arranged concentric with the permanent magnet rings or annuli. In preferred embodiments, the linear actuator is configured for single phase power input to the coil, the coils preferably being connected to one another in opposing polarity.

The or each permanent magnet ring or annulus preferably comprises a substantially radially magnetised structure. Each ring or annulus may be formed from an array of arcuate permanent magnets arranged end to end about the circumference of a tubular core, for example.

In a preferred embodiment, each coil is positioned in an annular recess in said stator, the recess defining an air gap between the coil and the armature. The recess may take the form of a semi-closed slot in the body of said stator.

The core is preferably of magnetic material, such as mild steel or cobalt iron, but may also comprise a plastic carrier for the magnet rings or annuli, or fixed structure about which the rings or annuli are arranged for axial movement relative thereto.

The permanent magnet rings or annuli are preferably axially spaced from one another. In a first embodiment, a pair of axially spaced annuli are provided on the core. These annuli preferably have the same external dimensions. In another embodiment, four annuli are provided in an axially spaced arrangement, preferably wherein the axial length of the inner annuli is twice the axial length of the outer annuli. A separate coil is preferably provided in concentric association with each permanent magnet ring or annulus. The number of coils preferably corresponds to the number of rings or annuli.

Preferably the stator comprises a tubular, preferably cylindrical, housing. In a preferred embodiment, the housing includes close fitting end caps, preferably of non-magnetic material such as aluminum, through which ends of the armature slidably protrude. These armature ends are in the preferred embodiment cylindrical and of the same diameter. A seal may be provided between the end caps and the armature ends to prevent the passage of debris to the interior of the stator.

The armature ends preferably extend in the axial direction of the stator, preferably concentric with the stator. The armature is preferably rotatably supported in bearings, for example in bushings provided in end caps of the stator housing.

The armature may be single acting or double acting and may incorporate or cooperate with one or more output members or devices, such as pistons, output rods, hydraulic or pneumatic pressure lines or other such force transmitting devices.

According to another aspect of the invention, there is provided a linear actuator comprising a stator and an electrically operable moving magnet armature within said stator, the armature comprising a core having opposing permanent magnet annuli arranged thereon, the stator having a plurality of coils arranged in association with said annuli, wherein the armature is movable axially of the stator on electrical energisation of said coils.

The electromechanical linear actuators of the invention are ideally suited for use in gearshift applications in automotive transmissions. Of course, it should be understood that the linear actuators of the invention are also suitable for use in a variety of other linear drive applications, not limited to automotive technologies. Nevertheless, the electromechanical linear actuators of the invention are particularly suited for the control of valves and actuators in high temperature environments where available space is minimised, such as in engines and automotive transmissions. The linear actuators of the invention can be used for controlling variable turbo actuators or wastegate valves, for example.

According to further aspect of the invention, there is provided a device for controlling an automatic transmission, the device including an actuator for actuating at least one selector shaft the actuator being a slidably mounted linear electromechanical actuator.

The actuator is preferably connected to act directly on the shift rail of an automotive transmission.

The actuator preferably contains at least one of an electromagnet and a permanent magnet, and is preferably a linear electromechanical actuator of tubular cross section. Alternatively, the tubular linear electromechanical actuator may be of a non-circular cross section, e.g. square or oval or triangular.

Preferably, the actuator includes permanent magnets mounted on the selector shaft of an automotive gearbox which forms the armature core.

Preferably, the actuator contains at least a permanent magnet comprising ferrite type magnets, neodymium iron boron magnets or samarium cobalt magnets.

Other aspects and features of the invention will be apparent from the appended claims and the following description of preferred embodiments of the invention, made by way of non-limiting examples, with respect to the accompanying drawings, in which:

FIG. 2 is a schematic cross-section through part of the armature from FIG. 1, showing the direction of radial magnetism of the permanent magnets;

FIG. 7 is a view similar to FIG. 2, showing the radial magnetism of the permanent magnets on the armature of FIG. 6;

Figure 1:
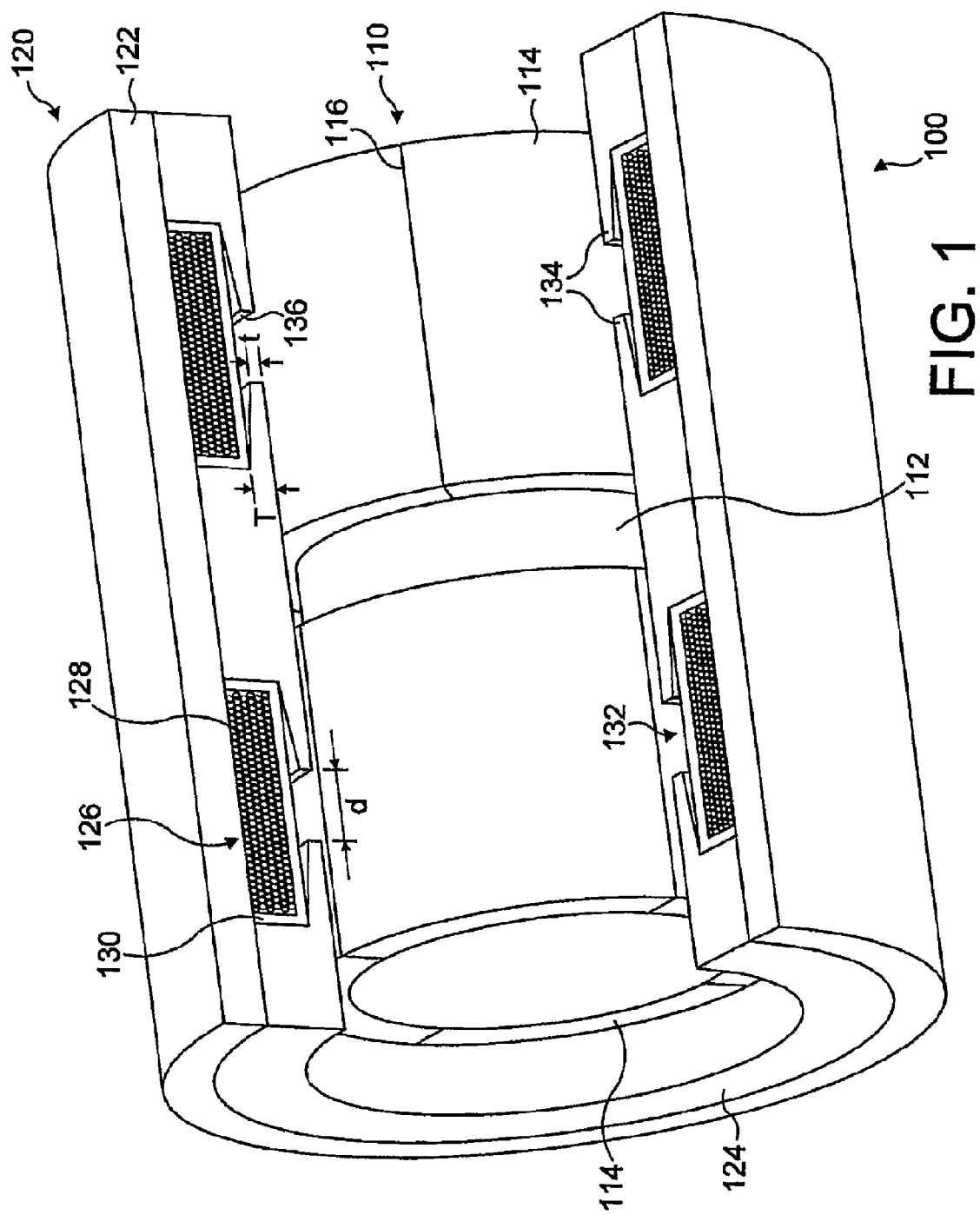
FIG. 1 is a schematic part cross-sectional perspective view of a 2-pole linear actuator.

Referring firstly to FIG. 1, a linear actuator is indicated generally at 100. The actuator 100 includes an electrically operable moving magnet armature 110 mounted concentrically within a stator body 120. The armature 110 is movable axially of the stator 120 upon electrical energisation thereof, as will be described in more detail below.

The armature 110 is in the form of a tubular core 112 of solid mild steel material (although any other magnetic material could be used, e.g. cobalt iron). Two permanent magnet annuli 114 of identical dimensions are provided on the core 112. The annuli 114 are arranged spaced from one another using a non-magnetic spacer, in the form of a plastic ring (not illustrated).

In this embodiment, each annulus 114 consists of four 90 degree arcs of NdFeB material. The ends 116 of the arcs abut with one another to form a continuous collar or ring about the core 112. As such, it can be said that the armature 110 includes tubular permanent magnet structure about said core 112.

Figure 3:
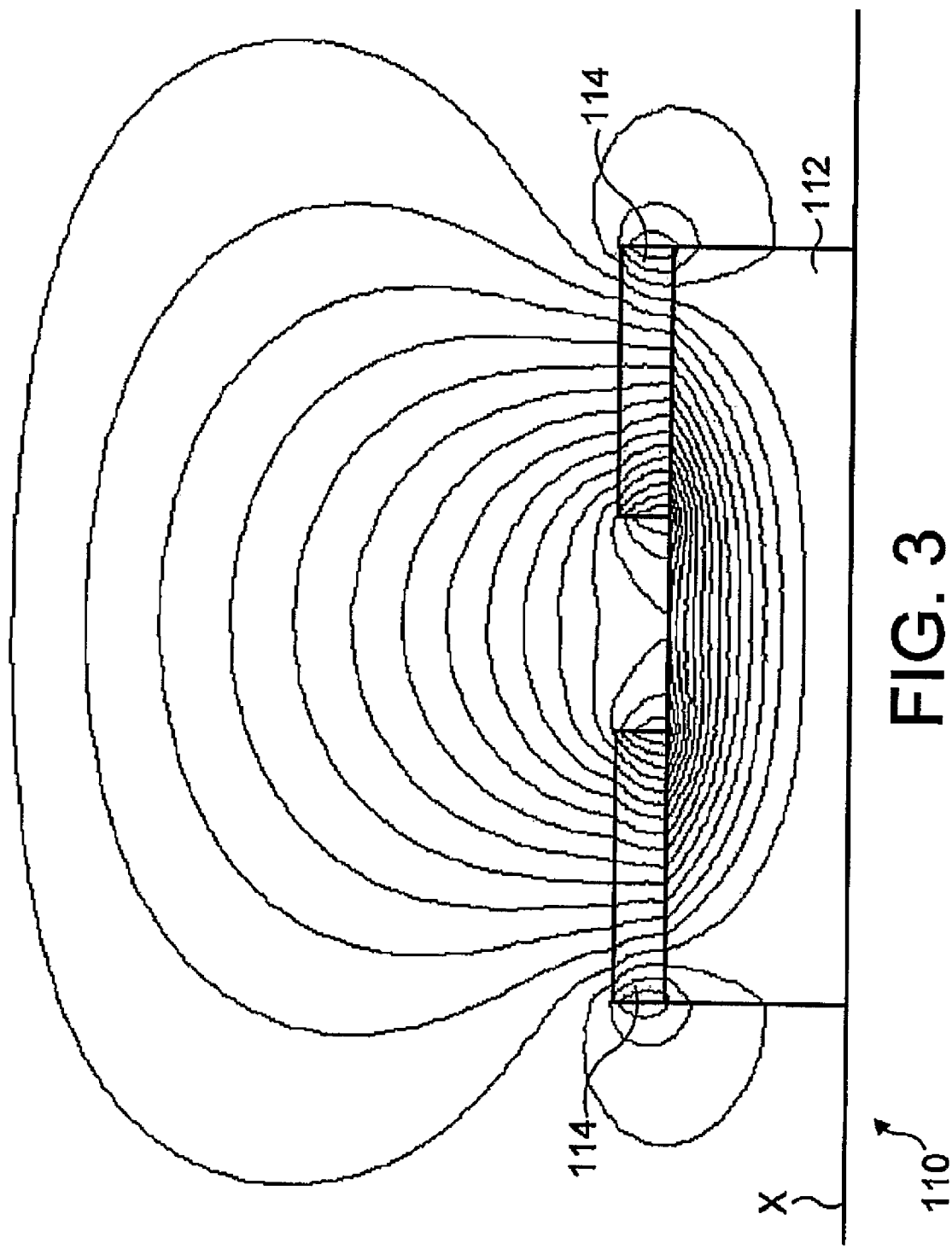
FIG. 3 is a view similar to FIG. 2, showing the magnetic field generated by the permanent magnets.

Each arc has a substantially radially magnetised structure. Moreover, the annuli 114 are arranged in opposite magnetic polarity to one another, as can be seen in FIG. 2, wherein the arrows indicate the general direction of radial magnetism. An example of the magnetic field provided by the annuli 114 is shown in FIG. 3, with the axis of symmetry and rotation of the armature 110 being indicated at X.

In alternative embodiments, it may be preferred to use three 120 degree arcs, eight 45 degree arcs or any other number of appropriately dimensioned arcs to form the tubular permanent magnet structure on said core 112. It may also be preferred to use a one piece tube, for example made from wire by erosion or extrusion.

Referring back to FIG. 1, it can be see that the stator body 120 is in the form of cylindrical tube. The stator body 120 is formed from an outer component 122, made from a magnetic material, preferably the same material as the armature core 112, and an inner component 124, which is also made from a magnetic material, preferably the same material as the armature core 112.

The inner component 124 defines a plurality of annular grooves or recesses 126 for locating respective electromagnetic coils 128. Each coil 128 is wound on a plastic bobbin 130 and secured on its bobbin using a potting compound. In this embodiment, each coil is positioned so as to be in association with a respective one of said magnetic annuli 114, concentric with the armature 110.

It should be noted that the coils 128 can be pre-wound and potted together for structural integrity, without a bobbin, prior to positioning on the stator body 120. The windings can also be wound directly onto the stator body 120.

It should be understood that the coils 128 of this embodiment are advantageously configured for single phase power input, i.e. with two wires extending from the actuator 100 for coupling to an external single phase power source. The coils may be connected together in series or in parallel.

Single phase actuators have the benefit that they are less complicated to control and operate than multiphase actuators, for example they can be operated using relatively simple algorithms, they require less switches (MOSFETs etc) and they do not need the kind of position feedback resolution associated with the control of multiphase devices.

The stator body 120 preferably includes limit stops, for limiting the axial displacement of the armature 110. The limit stops may take the form of end caps provided to enclose the armature 110 within the stator body 120, for example.

The coils 128 are arranged in the stator body 120 with a clearly defined air gap 132 provided between each coil 128 and the armature 110. The air gap 132 is primarily defined by the inner component 124 of the stator body 120, wherein the coils 128 are also spaced radially of the armature 112.

In this embodiment, the side walls of the recesses 126 include axially opposing projections or tips 134 that extend towards one another beneath their respective coils 128. These tips 134 are separated by a gap of width d. The tips 134 have a tapered cross-section having a root thickness T and an end thickness t (which is less than the root thickness T). Each tip 134 terminates in an axially facing shoulder 136.

In an alternative embodiment, the tips may be of rectangular cross-section, wherein the thickness of each tooth is uniform along its axial length, for example.

The tips 134 are advantageous in that they provide a convenient spacer and locator for the radial position of the coils 128 relative to the armature 110. As can be seen, the bobbins 130 are supported on the tips 134, in this embodiment.

The use of a stator 120 having portions which extends axially beneath the respective coils 128 is also advantageous in that it increases the coil flux linkage to the permanent magnets, when the coils are energised. As such, it will be understood that the configuration of the stator, and in particular the axially extending tips, can be therefore be modified to improve the efficiency of the actuator 100, wherein the increase in coil flux linkage can reduce the power input required to drive the armature 110, for example. Increasing the axial length of the tips 134 also improves the force-per-unit current that the actuator 100 can provide.

However, it is also important to maintain a spacing d between the tips 134 to provide saliency forces within the stator body 120 during zero power conditions. The stator body can be configured to ensure that there is sufficient saliency to hold the armature at the end of its axial stroke after powered movement of the armature 110, for example. It should be noted that the magnitude of saliency is inversely proportional to the tooth tip dimensions, so a reduction in axial length of the tips 134 increases the saliency force at the device end stops. By controlling the tooth tip dimensions it is possible to modulate the saliency characteristics of the actuator 100. It may also be possible to include a detent to temporarily hold the armature at one or more of its preferred stop positions along its stroke, as an alternative to or in combination with the saliency forces.

To assemble the actuator 100, the inner component 124 of the stator body 120 is positioned inside the outer component 122, with each coil 128 pre-wound on its respective bobbin 130 and located in a respective recess in the inner component 124.

The coils 128 are thereby sandwiched between the inner and outer components of the stator body 120.

The armature 110 is then positioned in the bore of the stator body 120 and restricted for axial movement within the stator body 120 by limit stop means, for example caps fitted to the ends of the stator body 120. The two winding terminations from the coils 128 preferably extend through a channel formed in the stator body 120, for coupling to an external power supply.

The actuator 100 is particularly suited for use in vehicle transmission applications, for example to act directly on a gearshift rail in either an automatic manual transmission or a dual clutch transmission, to facilitate gear selection.

Figure 4:
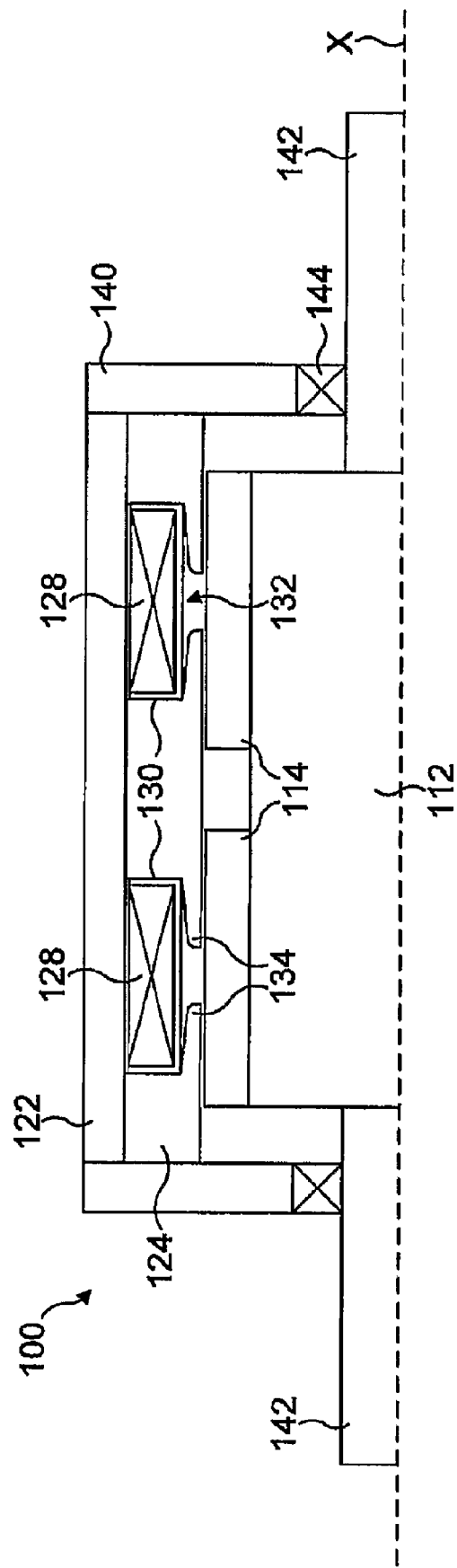
FIG. 4 is a schematic cross-section through part of a further linear actuator for use in a vehicle transmission.

An example (which may also be suitable for general actuation applications) is shown in FIG. 4, wherein the stator body 120 includes opposing end caps 140, which enclose the core 112 within the stator body 120. The end caps 140 are preferably of non-magnetic material, such as aluminum.

The core 112 is mounted concentrically on a tubular rod 142 which extends through and beyond each of said end caps 140, to act as a reciprocating output member of the actuator 100, for linear actuation of at least one external mechanism or device, for example. The rod 142 is rotatably supported in bearings 144, for example plastic bushings, in the end caps 140. The axis of rotation of the armature 110 is indicated at X.

The output rod 142 is simply supported and the armature 110 may rotate in its bearings 144 without affecting performance. A seal may be provided between the rod 142 and bearings 144, to prevent or significantly hinder the passage of debris in to the stator body 120, in particular magnetic swarf particles or the like, although the bearings 144 may themselves provide this function.

In the illustrated embodiment of FIG. 4, the armature 110 is limited to short stroke applications within the stator body 120, for example 16 mm (±8 mm stroke about a neutral centre position).

In order to compete with known hydraulic actuation systems for gearbox applications, the dimensions of the stator body 120 are limited in this preferred embodiments to 100 mm axial length by 100 mm diameter.

A method of operating the actuator 100 for the purpose of driving a gear shift rail will now be described, wherein the distal ends of the output rod 142 are arranged in communication with a gearshift rail, and wherein the terminals of the coil windings 128 are connected to a single phase power supply.

In a first non-powered state, the armature 110 is at rest in a centre position between the end caps 140, wherein the gearbox is arranged in a neutral condition.

Figure 5:
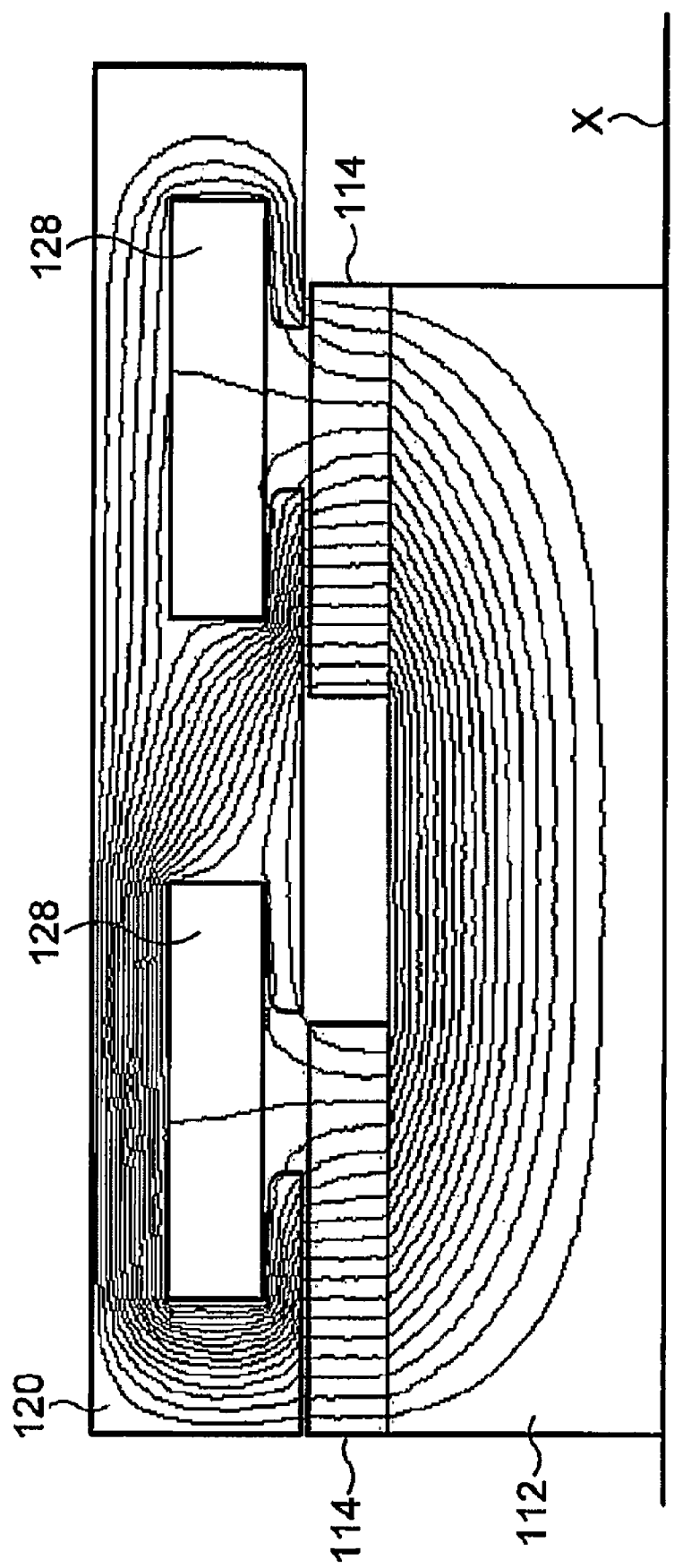
FIG. 5 shows an example of flux linkage between the energised coils and the armature of the actuator in FIG. 4.

In order to shift the transmission from its neutral condition into gear, a voltage is applied across the phase winding terminals, which causes a current to flow in the phase windings 128. It will be understood that the current rise time is governed by the phase time constant (which is determined by the phase inductance and resistance). The current in the phase windings produces a magnetic field in the stator body 120 that links with the permanent magnetic field in the armature. The permanent magnetic field in the armature 110 then attempts to align with the stator magnetic field, causing an axial shift of the armature 110 in order to accomplish this. An example of the flux linkage between the coils 128 and the armature 110 is shown in FIG. 5, with the coils 128 energised and the armature 110 moved to one of its end stops, e.g. from right to left as viewed in FIG. 5.

In order to release engagement of the gear, a voltage of opposite polarity is applied across the phase winding terminals, which causes a current to flow in the phase winding in an opposite direction. The current rise time is again governed by the phase time constant. The phase current then produces a magnetic field in the stator body 120 of opposite polarity to that described in the neutral to gear description. The stator magnetic field then links to the armature magnetic field and causes the armature to shift in the opposite axial direction, e.g. from right to left as shown in FIGS. 4 and 5, as the armature magnetic field attempts to align with the stator magnetic field.

Unless the 'release' current is controlled, the armature will be moved to its opposite end stop position, which preferably represents an alternative gear engagement position. However, the current can be controlled in order to cause the armature to stop at neutral position (a point of unstable equilibrium). Furthermore, a mechanical detent can be provided, e.g. on the stator body 120, to ensure that the armature 110 is prevented from moving once the neutral position has been found and the phase current has fallen to zero.

As mentioned above, the efficiency and dynamic response of the armature movement is enhanced by the opposing tips 134. The stator is advantageously configured in that it provides a physical pathway for the magnetic field around the coils rather than directly across the coils in the case of known "air gap" windings, for example.

The stator can be configured such that saliency effects, as described above, are able to maintain the position of the armature at its end stroke positions in the absence of current in the phase windings. Hence, the actuator 100 is particularly advantageous in that the armature can remain in its end stroke position even when the coils are in a non-powered state.

It should be understood that the saliency characteristics can be changed by altering the profile of the portions of stator adjacent the coils.

In certain applications, it may be preferred to avoid the use of tips 134 projecting axially beneath the coils 128, and instead to rely solely on a portion of the side walls of each recess depending radially inwardly of the coils, e.g. as an open slot, to provide both the saliency effects and coil flux linkage effects.

The single-phase, moving-magnet armature illustrated in FIG. 4 has been shown to provide a high output force density, with substantially constant actuator force-displacement characteristic across short stroke applications of the kind referred to above, for example 5-15 mm from a rest position.

Figure 6:
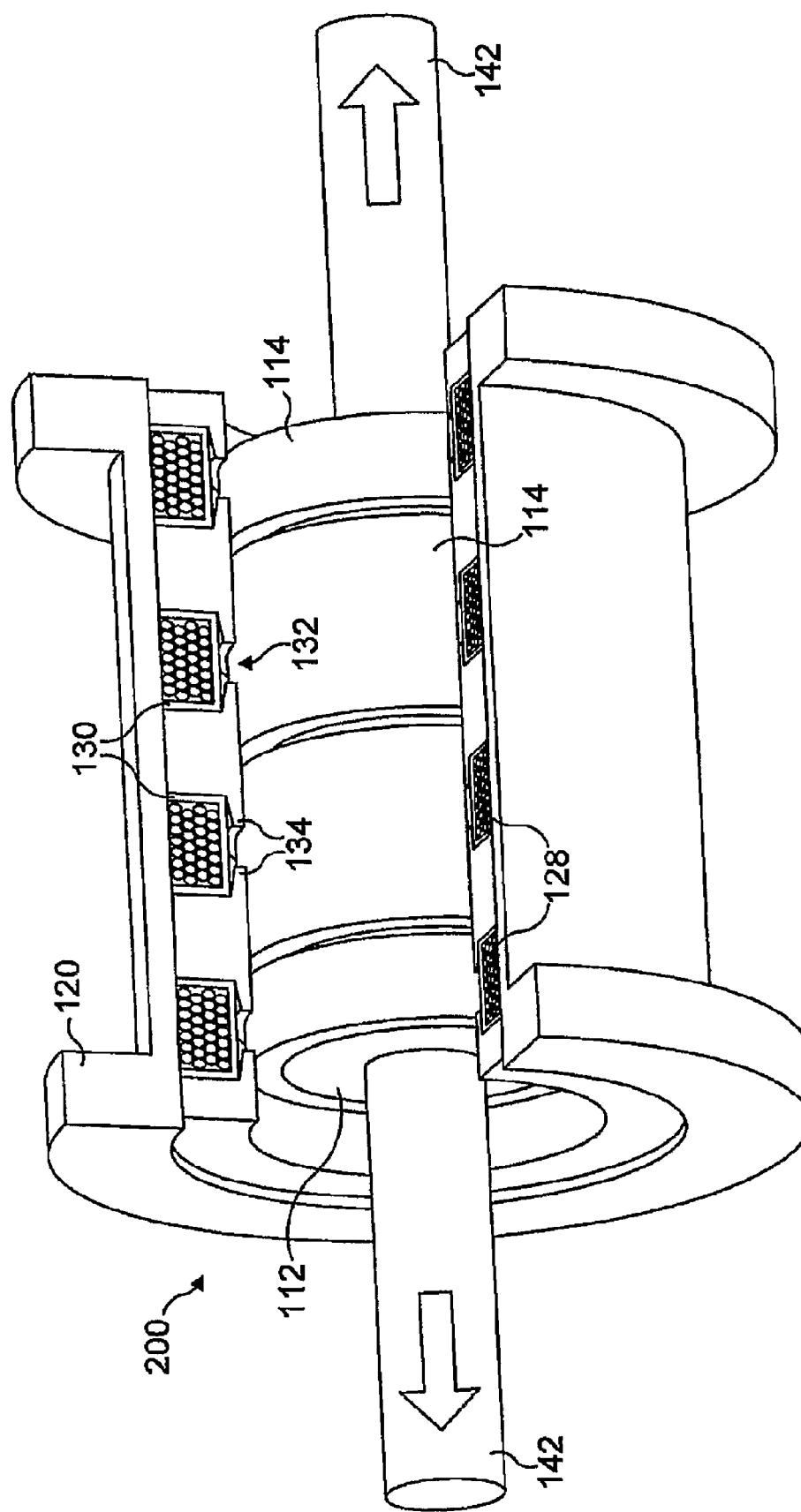
FIG. 6 is a view similar to FIG. 1, showing a 4-pole linear actuator.

An alternative actuator 200 is shown in FIG. 6, utilising many of the same reference numerals used in FIGS. 1 to 5 to denote the same or similar components. In this embodiment, the actuator includes four coils 128 concentric with four permanent magnet annuli 114, wherein the annuli are axially spaced from one another and arranged in opposite magnetic polarity to one another. As can be seen, the inner annuli 114 have an axial length which is twice the axial length of the outer annuli 114.

By increasing the number of coils 128 and associated annuli 114 from two to four, the size of the moving mass and also the diameter of the stator body can be reduced, whilst maintaining substantially the same axial thrust characteristics as the two pole actuators shown in FIGS. 1 to 5, for a fixed axial length and peak force requirement.

In this four pole embodiment, the coils 128 also configured for single phase power input and may be connected in series opposition, i.e. with a first coil is wound clockwise and an adjacent coil 128 is wound anti-clockwise, or in parallel. Again, two wires extend from the actuator 200 for coupling to an external single phase power supply.

Figure 8:
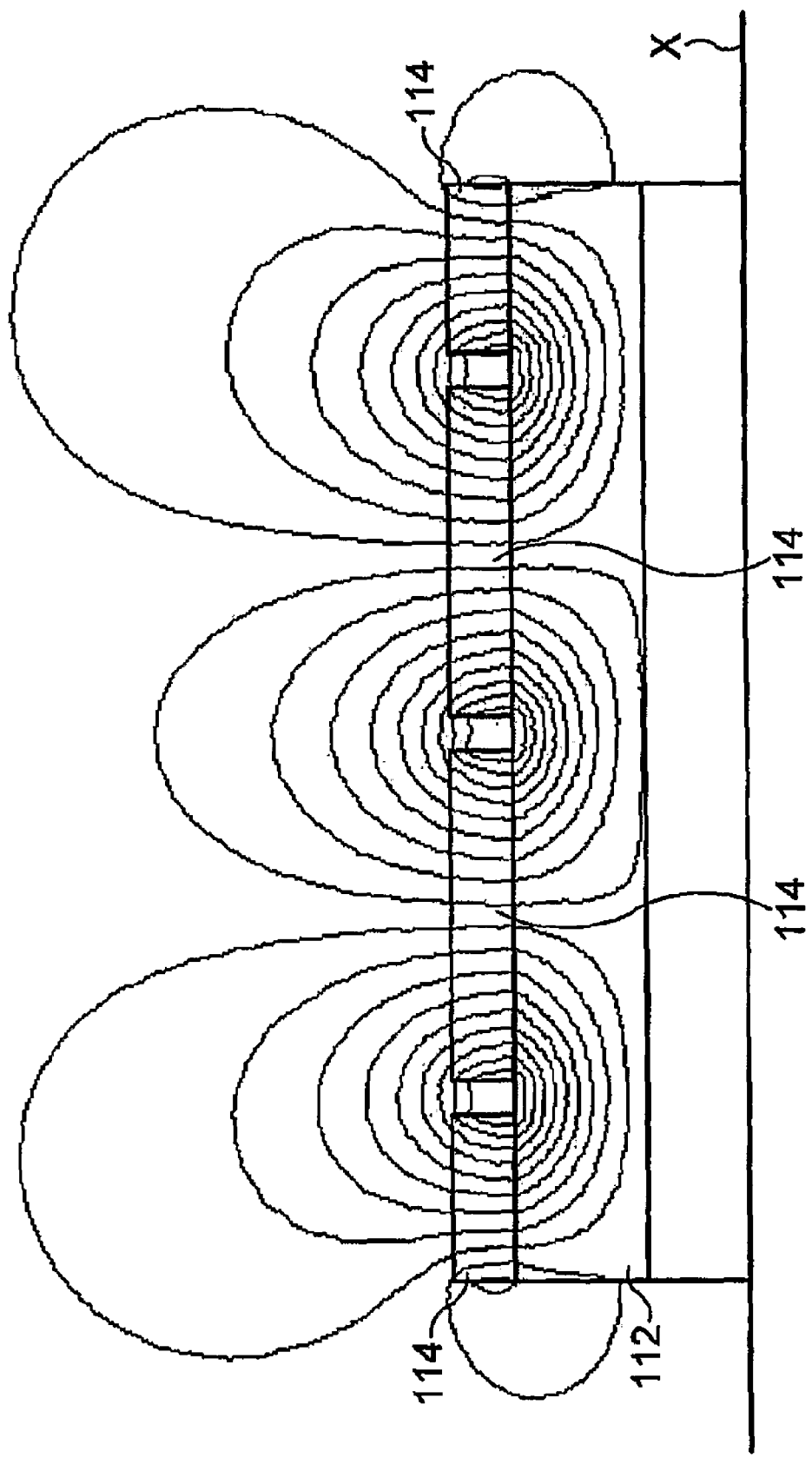
FIG. 8 is a view similar to FIG. 7, showing the magnetic field generated by the permanent magnets on the armature of FIG. 6.

FIG. 7 indicates the direction of radial magnetism of the permanent magnets, whereas FIG. 8 is an example of the magnetic field provided by the permanent magnets.

Figure 9:
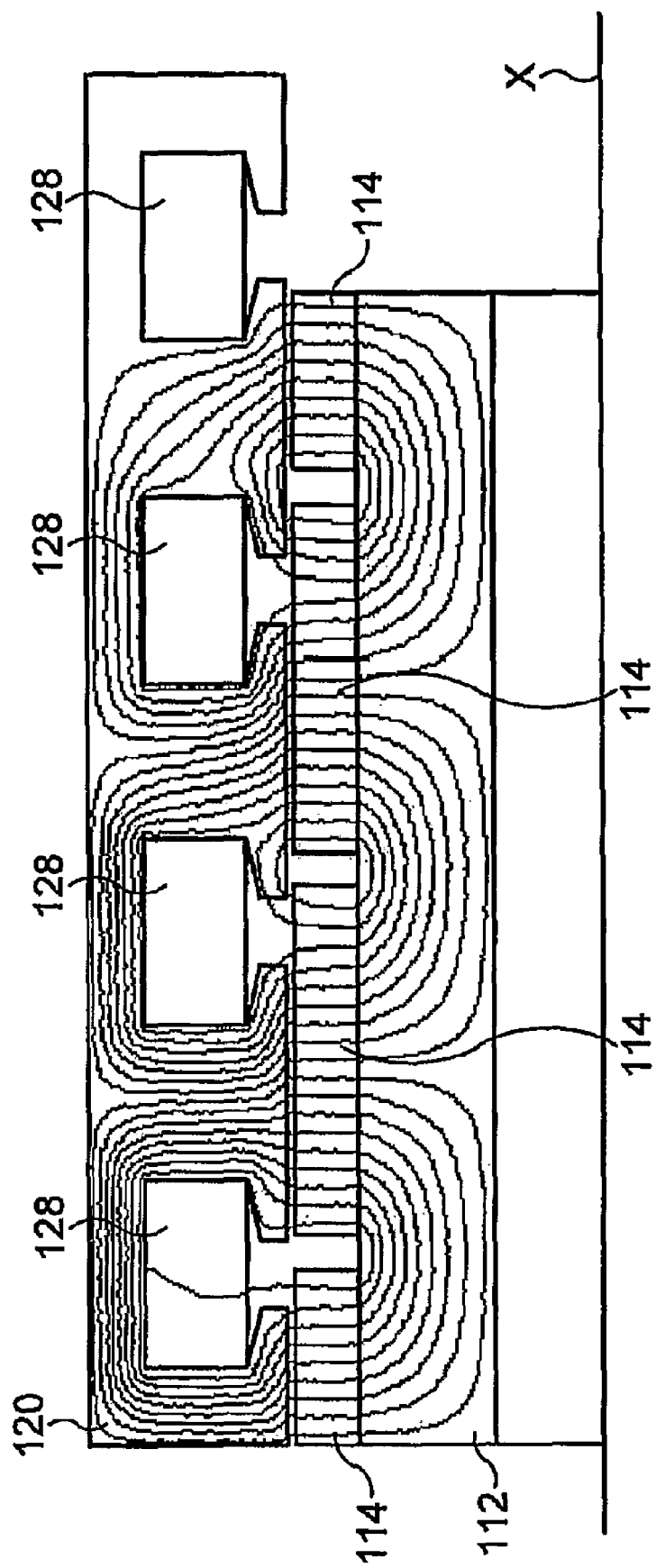
FIG. 9 shows an example of flux linkage between the energised coils and the armature of the actuator in FIG. 6.

FIG. 9 is similar to FIG. 5 and indicates the flux linkage between the stator coils 128 and the armature 110, with the armature 110 moved right to left.

The electromechanical linear actuators of the invention provide alternatives to hydraulic and electrohydraulic actuators, with benefits such as improved efficiency and dynamic response, as well as providing simplified and, thereby, more robust assemblies.

The tubular coil arrangements described above are advantageous in that it they have no end-windings and therefore approximately zero end-leakage flux, since the or each coil is concentric with the armature within the stator body, and not wound in a predominantly axial direction on the stator. By arranging the coils in the manner described above, concentric with a tubular armature, the induced magnetic fields are substantially contained within the actuator body and stray leakage can be minimised. This is an important consideration if the actuator is required to operate in an environment which contains large amounts of ferrous swarf, such as in or adjacent a vehicle transmission. It is also preferred that the axial movement of the armature core is limited to within the stator, for example using non-magnetic end caps as limit stops.

The actuators of the kind referred to above are particularly suited to short stroke applications, for example in the region 5 to 10 mm about a central position. They provide a high output force density and, more importantly, exhibit a substantially constant actuator force-displacement characteristic across such short strikes in both directions of travel, compared with the highly non-linear force displacement characteristics of a solenoid, for example. Therefore, the actuators of the preferred embodiments exhibit a more controlled force output.

A search winding can be wound on the same bobbin or co-wound amongst the turns of the or each coil 128. By monitoring the voltage induced on the search coil as a result of movement of the armature within the stator bore, the operative position of the armature can be predicted.

The armature core and stator of the actuators described above are preferably of solid construction, rather than laminated. This reduces eddy currents that would otherwise be induced by time varying magnetic fields and armature movements, and which would reduce the dynamic response and efficiency of the actuators.

The actuators are preferably provided with an electronic drive including a buffer capacitor as an energy store, for providing energy to the coils 128 during an armature shift event (e.g. from neutral to an end stop or output position). The capacitor can be trickle charged between shifts to replenish its stored energy. As such, the capacitor can be rated to provide energy for a number of consecutive axial shifts of the armature, so that it does not become completely discharged during use. This is particularly useful in gearshift applications, where average shift duration is small and time between shifts is large. It also reduces the upstream peak current load required by the associated vehicle wiring harness.

The invention claimed is:

1. A gear selector shaft for a vehicle transmission, the shaft being movable in a first axial direction from a neutral position to a first gear engagement position and in a second axial direction from said neutral position to a second gear engagement position, wherein the gear selector shaft incorporates a single phase linear actuator for controlling movement of the gear selector shaft between said first and second gear engagement positions, wherein the linear actuator comprises a stator defining a tubular bore, and wherein said gear selector shaft extends through said tubular bore, wherein the linear actuator further comprises a radially magnetized moving magnet armature which is movable within said stator between first and second stator positions, wherein a portion of the selector shaft forms a core of the armature, and wherein the armature includes radially magnetized permanent magnet annuli arranged on said portion of the selector shaft in opposing magnetic polarity to one another, wherein the stator has a plurality of recesses and a coil mounted in each recess, and further includes portions which define a fixed air gap between the coils and the armature, wherein each coil is positioned to be in concentric association with a respective one of said radially magnetized permanent magnet annuli, wherein the coils are connected to one another to form a single phase coil configured for single phase power input, wherein, upon energization of the single phase coil, the armature is movable axially within the stator between said first and second stator positions, wherein, in a first non-powered state, the armature is at rest in a central position intermediate the first and second stator positions, and the selector shaft is in said neutral position so that the gearbox is in a neutral condition, wherein in order to shift the transmission from its neutral condition into gear, the single phase coil is energized using a voltage of a first polarity, thereby causing an axial shift of the armature from the central position to the first or second stator positions, whereupon the shaft arrives at a respective first or second gear engagement position, and wherein under the application of a voltage of opposite polarity, the armature is controlled to return to its central position.

2. The gear selector shaft according to claim 1 wherein the stator of the linear actuator includes non-magnetic end caps, and the armature has at least one output end which extends in the axial direction of the stator, and which slidably protrudes through a respective end cap.

3. The gear selector shaft according to claim 1 wherein the armature of the linear actuator is configured for a short stroke displacement in the range of 5-15 mm from a rest position.

4. The gear selector shaft according to claim 1 wherein the stator of the linear actuator comprises an inner component and an outer component, and wherein the inner component defines the recesses for said coils.

5. The gear selector shaft according to claim 4 wherein the outer component of the linear actuator defines a tube within which the inner component and coils can be slidably positioned.

6. The gear selector shaft according to claim 1 wherein the stator of the linear actuator is formed of solid magnetic material.

7. The gear selector shaft according to claim 1 wherein the stator and armature core of the linear actuator are formed of the same solid magnetic material.

8. The gear selector shaft according to claim 1 wherein the stator of the linear actuator includes opposing projections of magnetic material extending axially towards one another beneath each coil, separated by an air gap, which are configured to improve the flux linkage between the coils and the moving magnet armature, so as to improve the efficiency and dynamic response of the linear actuator.

9. The gear selector shaft according to claim 1 wherein each permanent magnet annulus of the linear actuator is formed from an array of arcuate permanent magnets arranged about the circumference of the core.

10. A method of controlling a gear selector shaft in a vehicle transmission, the method comprising the step of providing a gear selector shaft with a single phase linear actuator for controlling movement of the gear selector shaft from neutral position to first and second gear engagement positions, wherein the linear actuator comprises a stator defining a tubular bore, and wherein said gear selector shaft extends through said tubular bore, wherein the linear actuator further comprises a radially magnetized moving magnet armature which is movable within said stator between first and second stator positions, wherein a portion of the selector shaft forms a core of the armature, and wherein the armature includes radially magnetized permanent magnet annuli arranged on said portion of the selector shaft in opposing magnetic polarity to one another, wherein the stator has a plurality of recesses and a coil mounted in each recess, and further includes portions which define a fixed air gap between the coils and the armature, wherein each coil is positioned to be in concentric association with a respective one of said radially magnetized permanent magnet annuli, and wherein the coils are connected to one another to form a single phase coil configured for single phase power input, wherein, in a first non-powered state, the armature is at rest in a central position intermediate the first and second stator positions, and the selector shaft is in said neutral position so that the gearbox is in a neutral condition, wherein in order to shift the transmission from its neutral condition into gear, the single phase coil is energized using a voltage of a first polarity, thereby causing an axial shift of the armature from the central position to one of the first or second stator positions, whereupon the shaft arrives at a respective first or second gear engagement position, and wherein under the application of a voltage of opposite polarity, the armature is controlled to return to its central position.

11. A method according to claim 10 in which movement of the armature is controlled to stop at a neutral position between respective gear engagement positions.

* * * * *